United States Patent Office 3,708,376
Patented Jan. 2, 1973

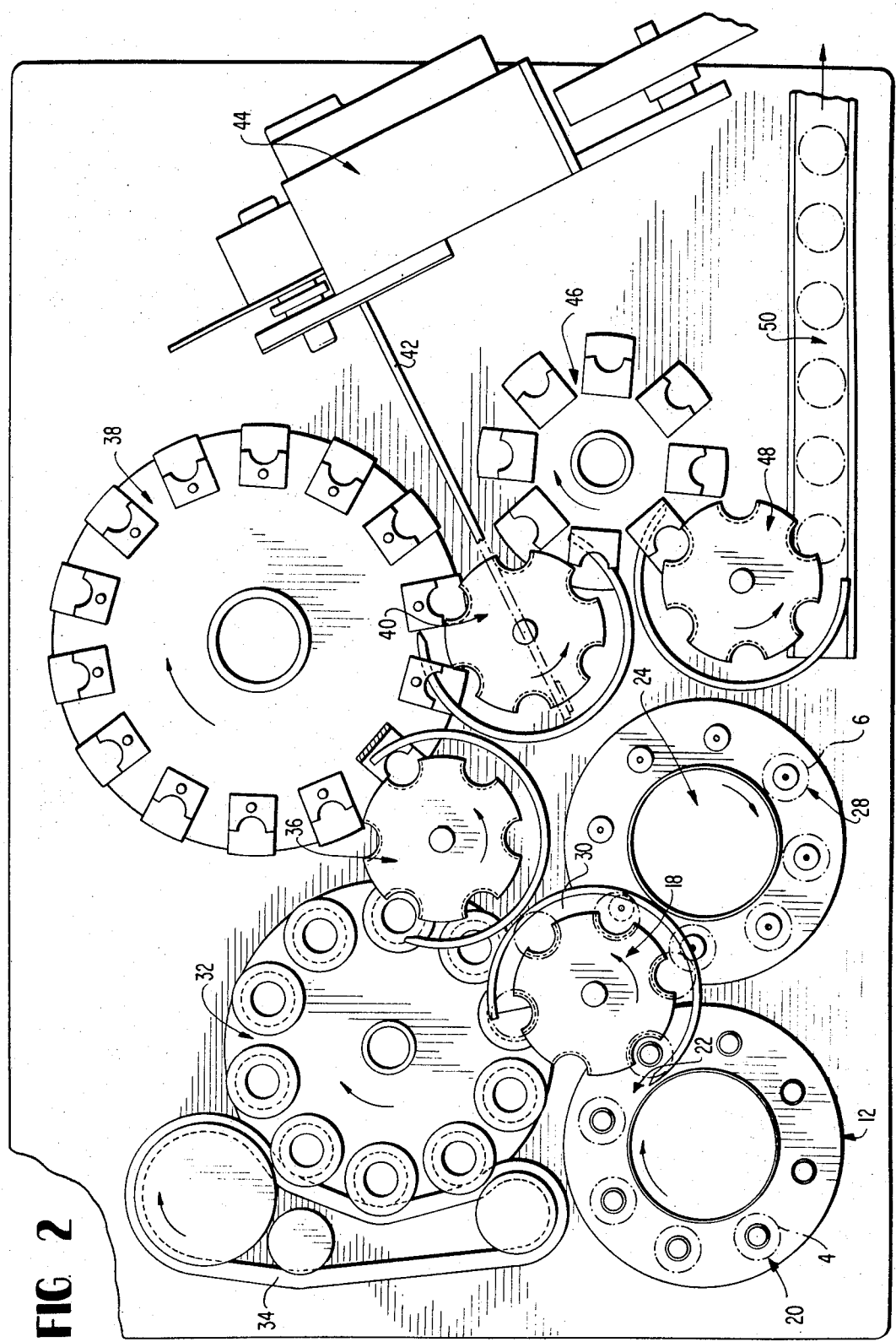

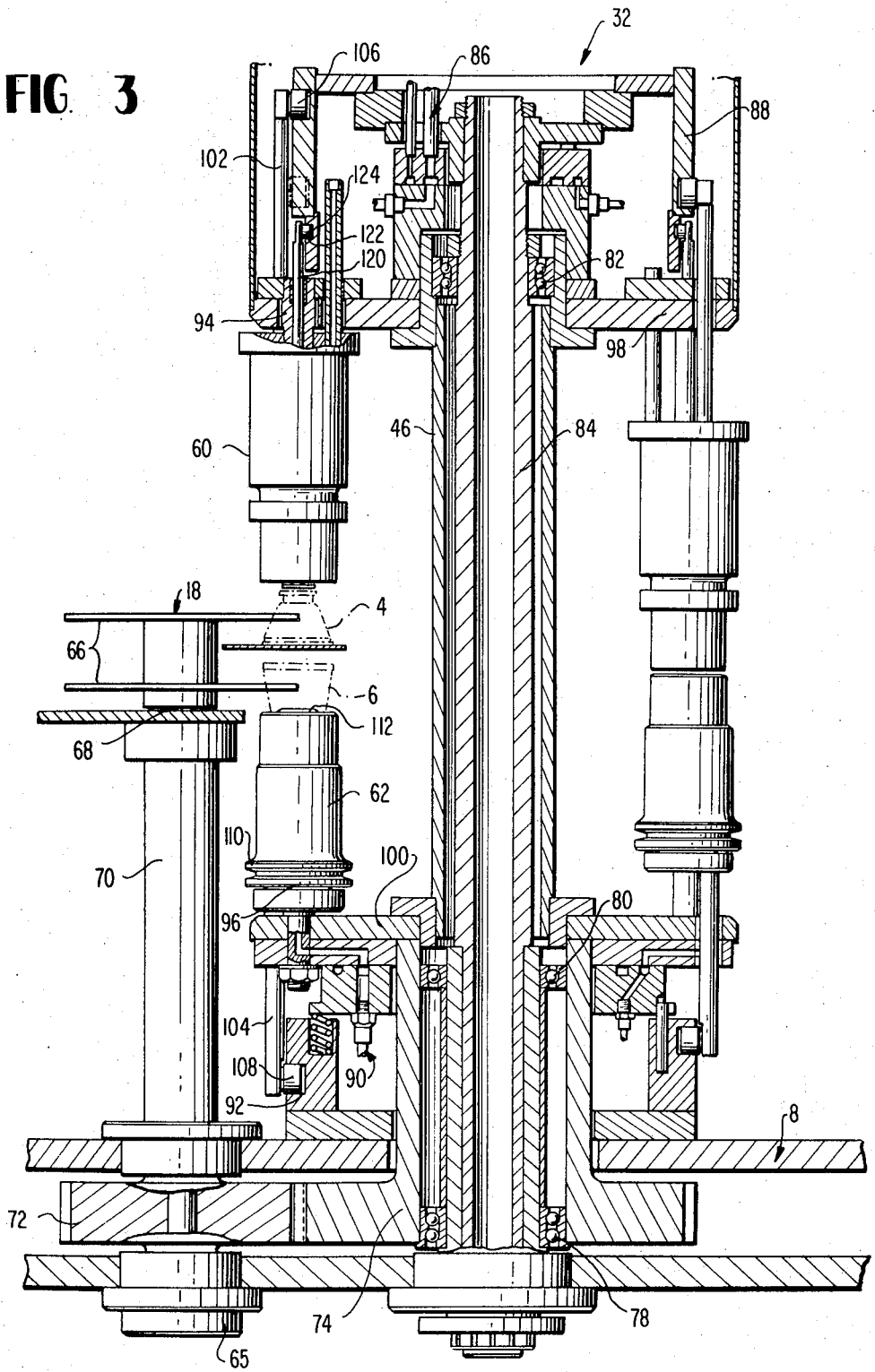

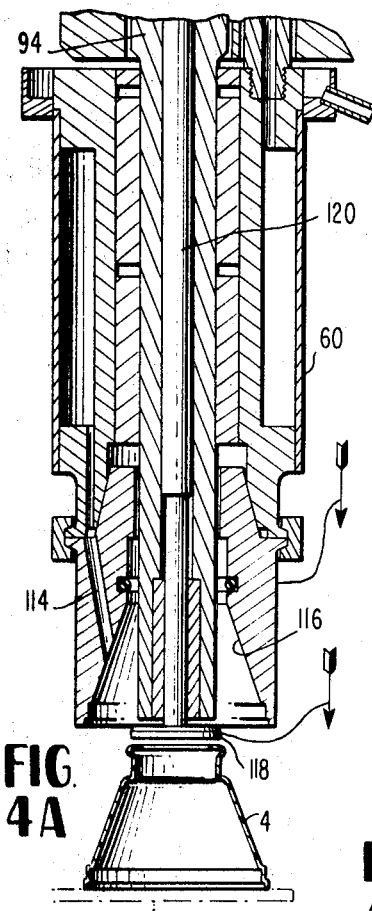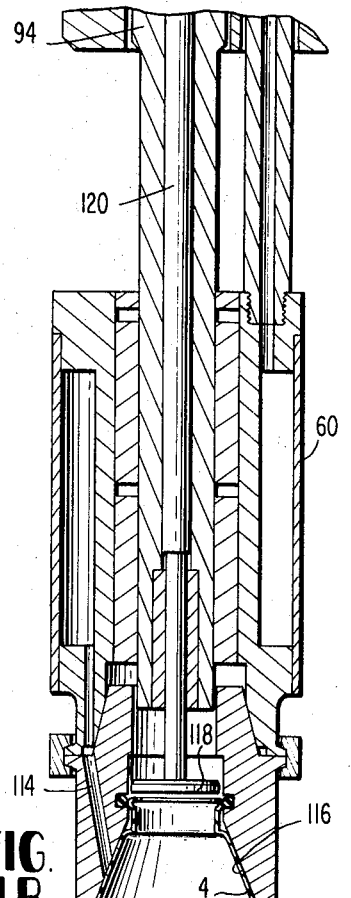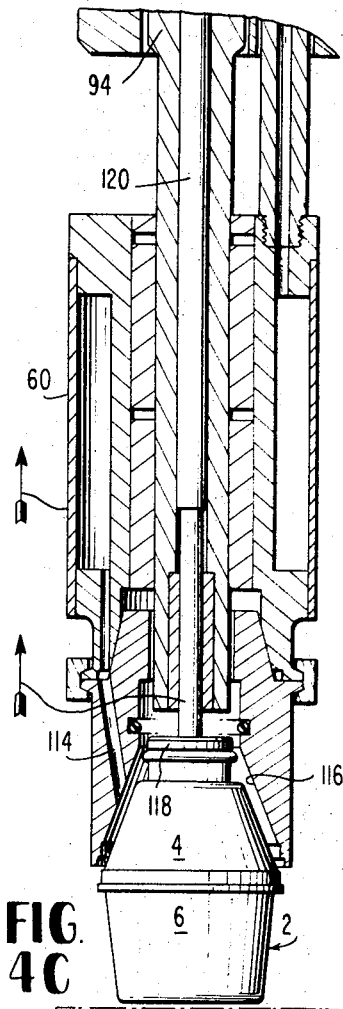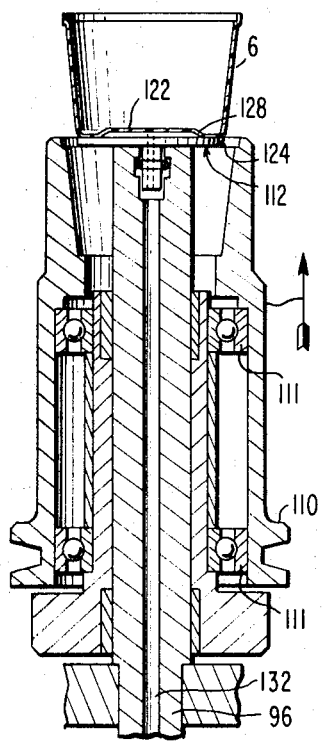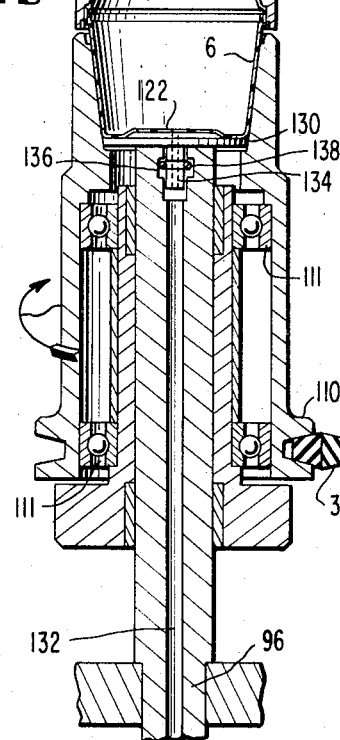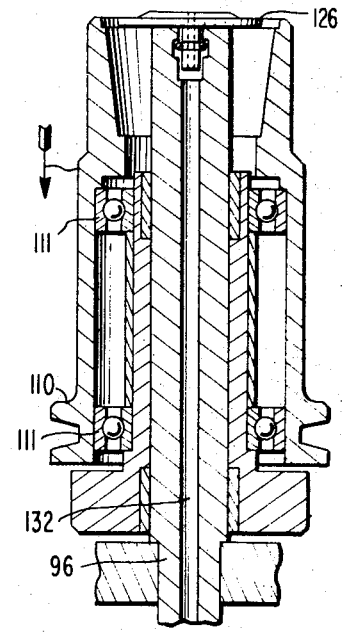
FIG. 4A  FIG. 4B  FIG. 4C

3,708,376
PEDESTAL ASSEMBLY
Robert J. Mistarz, Northbrook, and Albert B. Mojonnier, Sr., Chicago, Ill., assignors to Koehring Company, Milwaukee, Wis.
Filed June 17, 1971, Ser. No. 154,060
Int. Cl. B30b 3/04
U.S. Cl. 156—580
7 Claims

ABSTRACT OF THE DISCLOSURE

A pedestal assembly for accurately receiving and positively capturing a lower thermoplastic container half when it is being transferred into and rotated by a spin welding apparatus. The spin welding apparatus frictionally joins the lower container half to an upper container half to form a unitary container. The lower container half is received by the pedestal assembly from a rotating star wheel transfer device which slides the lower container half onto a stage portion of the assembly. The pedestal assembly having the container half thereon is then rotated in an opposite direction from that of the star wheel transfer device. The pedestal assembly including the stage portion has a dome-shaped upper surface which cooperates with a complementary recessed bottom of the lower container half. Vacuum means is applied through a central opening in the pedestal assembly for aiding in the positive capture of the lower container half.

CROSS-REFERENCES TO RELATED APPLICATIONS

The disclosure of this application is related to the disclosures of the applications entitled "Jaw-Operated Cup-Dispensing Mechanism and Method," "Trapped Cam Assembly," "Heat Sealing Apparatus and Method and "Automatic Plastic Bottling System and Method" of common inventorship and being filed concurrently herewith.

BACKGROUND OF THE INVENTION

This invention is concerned generally with a spin welding apparatus for frictionally welding two thermoplastic container halves and relates particularly to an assembly for receiving and holding a lower container half transferred from a rotating star wheel.

The art of joining relatively thin-walled thermoplastic container halves by means of spin welding is shown generally in U.S. Brown et al. Pat. No. 3,297,504. Container halves are received from a conveyor or star wheel which singularly slidably delivers the container halves to hollow mandrels or spindles which may be rotated about their own axis for subsequent container joining. The lower container half is slid onto a pedestal post extending centrally from the lower mandrel. The mandrel is then caused to surround the container half and rotate it about its own axis. The rotating container half is then brought into contact with the upper container half and relative motion therebetween generates sufficient heat to fritcionally weld the container halves.

When transferring container halves from a star wheel transfer device to spin welder platforms, it has been found that containers having relatively flat bottom surfaces are easily received by platforms or pedestal assemblies having conforming planar surfaces. Container halves slid onto these relatively flat-topped pedestal assemblies were generally adequately supported at their centers and about their peripheries. Thus, the pedestal would always be in contact with relatively large areas of the bottom of the container half during transfer from a star wheel. However, it is sometimes desirable to provide thermoplastic containers with recessed or indented bottoms to give them additional strength. For example, the stripping force applied by the pedestal post to a flat container base for stripping it from the mandrel after the spin welding operation sometimes ruptures or weakens the container. This problem does not occur with containers having recessed or indented bottoms. In addition it can be appreciated that when filling containers with liquids or solids, bulging of the container bottom may occur if it is not of the recessed type. This proves problematical for high speed mass handling of containers because bulged bases impart a tipping attitude to filled containers and this state of unsteady equilibrium sometimes permits or causes spilling, improper closure sealing and/or container flow jamming. A container of recessed base type is shown generally in U.S. Design Pat. No. 204,107.

Containers provided with recessed bottoms, however, presented problems not heretofore recognized when handling flat-bottomed containers. For example, the recessed bottoms could be caused to tip when they are being transferred from a star wheel to an awaiting pedestal. The outer edge of the recess may contact the awaiting pedestal but the recess would be unsupported as it moved to the pedestal. Additionally, once the container half was delivered to the pedestal it was difficult to properly center the container half on the pedestal as well as to support the bottom of the container half.

Prior art pedestal assemblies were usually one of two types. The first type of pedestal comprised a circular member having a flat or domed upper surface, the diameter of which conformed generally to the recessed area of the container bottom. With this type of pedestal the container half slid across the pedetsal upper surface with the extending outer edges generally surrounding the pedestal. Container halves were thus supported and generally centered at their recessed portions but were left unsupported at their extending outer edges.

The second type of pedestal was of a similar flat shape but the diameter thereof was slightly larger than the diameter of the entire container bottom. When using this type of pedestal, the outer edges of the recessed container bottom rested securely upon the pedestal platform but the central recess was unsupported. Additionally, when using a pedestal having a larger diameter, the container half was not properly centerable on the pedestal. It can be appreciated that when container halves are to be surrounded, for spinning by mandrels, accurate centering is important if container half damage is to be avoided.

SUMMARY OF THE INVENTION

This invention has as one of its objects the provision of apparatus for accurately receiving thermoplastic container halves onto a pedestal assembly which rotates in a circular path about the central axis of a spin welding unit.

Another object of the invention is to provide spin welding apparatus wherein container halves having recessed bottoms are positively received on a pedestal assembly for subsequent joining with the upper container half.

Yet another object of the invention is to provide a spin welding apparatus which receives recessed container bottoms and accurately centers them upon a pedestal assembly.

An additional object of the invention is to provide a spin welder container receiving pedestal which simultaneously supports and centers the recessed bottom of a lower container half.

In the spin welding apparatus of the invention a plurality of facing mandrels are moved about a circular path having a generally vertical axis conforming with the center line of the spin welder. The lower of the facing mandrels has a generally central shaft running therethrough with a pedestal assembly at the top thereof. Lower container halves are supplied to the pedestal assembly as they pass one portion of the path. Later, as the facing mandrels having container halves therein move along the circular path, they are caused to come together and frictionally weld the container halves.

The pedestal assembly preferably includes a plurality of support means for supporting the central recessed portion of the lower container half and the outer edge of the container half.

Additionally, the pedestal assembly is so conformed as to fit substantially within the recess formed in the lower container half. This substantial conformity assures accurate centering of the container half upon the pedestal assembly.

A more complete understanding of these and other features and advantages of the invention will be gained from a consideration of the following detailed description of an embodiment illustrated in the accompanying drawings.

BRIEF DESCRIPTION OF THE DRAWINGS

FIG. 2 is a somewhat diagrammatic plan view of the machine of FIG. 1.

FIG. 3 is a vertical cross-sectional view through the spin welding unit of the machine of FIGS. 1 and 2.

FIGS. 4A, 4B, and 4C are operational views of the spin welder of FIG. 3.

DETAILED DESCRIPTION OF THE PREFERRED EMBODIMENTS

Figure 1:
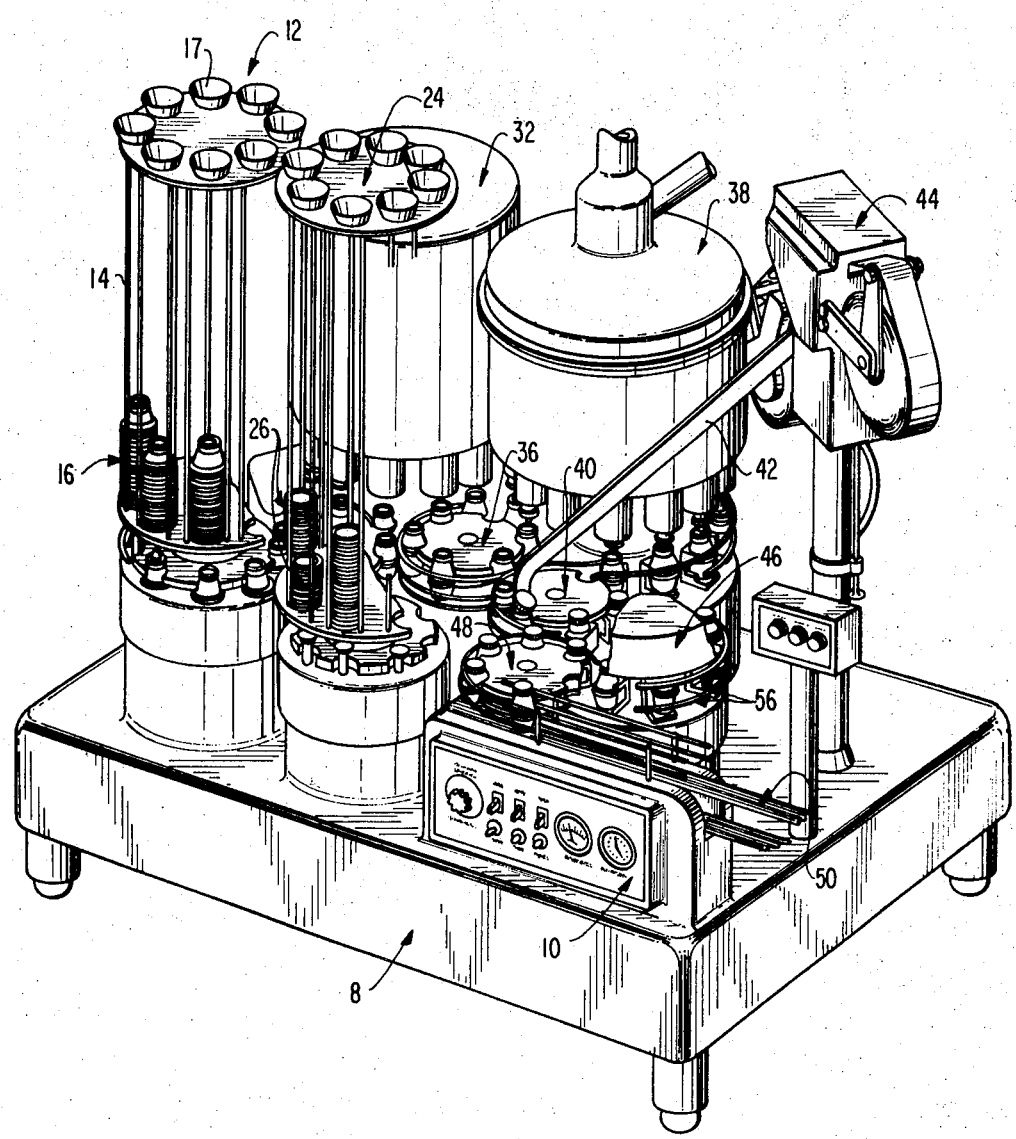
FIG. 1 is a perspective view of a machine for making plastic milk bottles, filling the bottles, and heat sealing closures onto the tops of the bottles, such machine embodying a spin welder constructed in accordance with the invention.

Although the invention is directed particularly to spin welding of thermoplastic container halves and more particularly to a pedestal assembly utilizable therewith, it will be helpful at the outset to describe generally the overall construction and operation of a milk bottling machine in which the new pedestal assembly is especially advantageous. Such a machine is illustrated in FIGS. 1 and 2. This machine assembles plastic containers from bulk supplies of nested container halves, fills the containers, and caps and seals the open tops on the filled containers. The various constructional and operational features of the machine are disclosed in detail in the several patent applications referred to above and the disclosure of each of them is incorporated herein by reference.

The containers are of configurations generally similar to that shown in U.S. Design Patent Des. 204,170, and indicated at 2 in FIG. 4. These containers are assembled from separately fabricated container top halves 4 and container bottom halves 6, with the two halves of each container being frictionally welded together at the middle of the container.

The machine is in the form of a base or table structure 8 carrying thereon a control panel 10, a series of processing stations and means for transferring the container portions to and from the various processing stations. The processing stations are all rotatable units, and transfers between stations are accomplished through rotating star wheels, permitting the compact and efficient arrangement indicated in FIG. 1 of the drawings.

The first processing station of interest is that which supplies container top halves 4. This container top half supply unit or denester 12 includes means for holding eight vertical stacks of nested container top halves 4 and for delivering container top halves therefrom, one at a time, for subsequent processing. As illustrated, groupings of vertical rods 14 establish the outlines for the several stacks 16 of nested container top halves. Additional container top halves may be supplied to each of the stacks 16 through funnel means 17 at the top of the unit 12. The several stacks 16 are arranged in a circle and the whole is rotated about the axis of this circle.

Means located below the stacks 16 of nested container top halves operate at one angular portion of the circle to remove the bottom container from each stack as that stack passes through such portion. Then the removed container top half is transferred from the top denester unit 12 onto a star wheel device 18. This sequence is indicated in FIG. 2, wherein the top denester unit 12 is shown to be rotating in a clockwise direction and where a container top half portion 4 is indicated to have been removed from the bottom of one of the container stacks at location 20 and transferred from the top denester 12 to the star wheel 18 at another angular location 22.

The container bottom halves are supplied from a unit 24 which is similar in its functions to the top container half supply unit or denester 12. Here again eight stacks 26 of nested container bottom halves 6 are located in a circular path and the stacks are revolved about the axis of this circle. As indicated in FIG. 2, the bottom denester 24 rotates in a clockwise direction, a container bottom half 6 is removed from the bottom of each stack 26 as that stack rotates past an angular location 28, and the individual container bottom halves 6 are transferred to the star wheel 18 in the zone of tangency between the units.

The star wheel 18 is, of course, a dual level device. The container top halves 4 are moved along an intermediately located support surface 30, while the container bottom halves 6 are disposed below the surface 30 but in vertical alignment with corresponding ones of the container top halves 4.

As the star wheel 18 rotates in a counterclockwise direction, it brings the vertically aligned container halves to a spin welder unit 32. This unit will be described in greater detail below. Generally, however, the container halves 4 and 6 are received on individual holders or mandrels and moved clockwise about a circular path. During one angular portion of this path, the mandrels for the container bottom halves are brought into contact with a drive belt 34 which serves to spin at high velocity about its own axis each of the container bottom halves which are captured within the mandrels. During this same time interval, the top edge of the container bottom half and the bottom edge of the container top half are brought together vertically into abutting relation. Since the container top half is not rotating about its own axis but a container bottom half is rotating in this fashion, a great deal of heat is generated by friction as the edges come into contact with each other. This heat serves to weld the thermoplastic material and provide a strong leakproof joint between the container edges at a location approximately in the middle of the joined container.

The joined container halves remain on the spin welder unit 32 for a sufficient time to permit adequate cooling of the newly formed joint. Then the containers are transferred one by one onto a star wheel unit 36 which delivers them to a filler unit 38.

The filler unit also is a rotating assembly. It receives the open topped containers at uniformly spaced locations about its periphery and revolves the containers through an arcuate path. A supply of the material, such as milk, to be introduced into the containers is located above the container support level of the unit, and as the containers move about the central axis of the unit they are raised individually into operative relationship to filler nozzle means which also rotate about the axis of the unit and which are disposed in vertical alignment with the container support stations. As each container is brought into operative relationship to the overlying filler nozzle, a measured portion of milk begins to flow into the container. The time during which the container is allowed to remain in operative relationship to the filler nozzle may, for example, serve to establish the quantity of milk introduced into the container. Thereafter, the container is lowered from contact with the filler nozzle and transferred from the filler unit 38 to another star wheel device 40.

While under the control of the star wheel device 40, each of the now filled containers passes beneath the end of a container closure or cap supply device 42. This device 42 receives caps formed in a mechanism 44 and disposes one such cap over the open top of each of the filled containers.

The filled containers with the caps resting thereon then move one by one onto the periphery of a heat sealer unit 46. Each container moves clockwise about the central vertcial axis of the heat sealer unit 46 and each filled container is supported during such movement so as to prevent tipping and misalignment. Then the container cap is brought into contact with a heater to cause the cap to be sealed to the remainder of the top opening in the thermoplastic container.

Thereafter, the sealed filled containers are delivered from the heat sealer unit 46 onto a star wheel device 48 and transferred to a delivery conveyor 50. The delivery conveyor 50 carries the filled and sealed containers to another location for such further processing as may be desirable in arranging them for shipment or the like.

Having described generally the overall arrangement and operation of the bottling machine of FIGS. 1 and 2, it will be helpful to refer now to the constructional features of the spin welding apparatus 32 illustrated in greater detail in FIGS. 3 and 4A–4C of the drawings.

The upper and lower container halves 4 and 6, respectively, are delivered from the star wheel device 18 into alignment with the center lines of an upper cylindrical mandrel 60 and a lower cylindrical mandrel 62. The mandrels are mounted for movement in a circular path about the central axis of the spin welder 32. The transfer takes place at an angular zone where the star wheel periphery moves into a position of tangency to the path followed by the several upper and lower mandrels. This transfer is assisted by conventional stationary guide rails 64 as illustrated in FIG. 2. The end portions of the guide rails 64 intersect the path of the container halves on the star wheel 18 and cause the container halves to move onto the mandrels rather than permitting them to continue to move about the axis of the star wheel.

The star wheel device 18 includes upper and lower circular plates 66 having cutouts at their peripheries for engaging the outer peripheries of the container halves 4 and 6. These plates 66 are carried by a shaft 68 extending though a stationary cylindrical member 70 and being connected at its lower end portion to a drive gear 72. This shaft 68 is journalled within bearing means carried by the frame or table 8 and indicated generally at 65 in FIG. 3.

The star wheel drive gear 72 is part of a gear train which interconnects all of the rotating components of the machine of FIGS. 1 and 2. For example, in a preferred machine there is power input to a drive gear for filler unit 38, and this drive gear (not shown) meshes with and transmits power through intermediary gears to the star wheel drive gear 72.

One of these intermediary gears is the spin welder drive gear 74 attached to a hollow drive shaft 76 extending upwardly about the center of the spin welder unit 32. This hollow shaft is rotatable about bearing means 78, 80 and 82 which are located between a stationary vertical shaft 84 and the hollow drive shaft 76.

At its upper end the center stationary shaft 84 supports a stationary vacuum supply means generally indicated at 86 and an annular cam track 88. The platform 8 also has as a part thereof a vacuum supply shown generally at 90 and an annular cam track 92. The detailed operation wherein the cam tracks 88 and 92 are used will be subsequently described.

It would be helpful at this point to describe generally the spin welding operation to form a basis for the detailed description which follows. The container halves, once aligned with the center lines of the upper and lower mandrels 60 and 62, are surrounded by the mandrels for subsequent spinning. The mandrels rotate about the central axis of the spin welder 32 and also move vertically toward each other when surrounding the container halves. The lower mandrel 62 which surrounds the bottom container half additionally rotates about its own axis during the spinning operation. Once the container halves are frictionally welded, the mandrels are caused to separate and free the surrounded joined container.

Each of the mandrels is movable vertically on a shaft which is stationary with respect to its own axis but which revolves about the central axis of the spin welder unit 32. The shafts for the upper mandrels 60 are designated 94 and the shafts for the lower mandrels 62 are designated 96. Each upper mandrel shaft 94 extends downwardly from a support member 98, and each lower mandrel shaft 96 extends upwardly from a support member 100. These support members 98 and 100 are carried by main rotating shaft 76 at the center of the spin welder, so that the mandrel shafts 94 and 96 revolve about the central axis of the spin welder 32. The rotational movement of the shafts 94 and 96 about the spin welder central axis causes the mandrels 60 and 62 to rotate therewith.

Vertical movements of the mandrels with respect to their shafts 94 and 96 are achieved by means of connecting rods 102 and 104 operatively connected to the mandrels 60 and 62, respectively. These connecting rods have cam followers cooperating with the previously mentioned stationary cam tracks to vertically position the upper and lower mandrels as they rotate about the central axis of the spin welder 32. The upper connecting rod 102 has cam follower 106 thereon for travelling within the stationary upper cam track 88. The lower connecting rod 104 also has a cam follower 108 associated therewith for movement within the lower cam track 92.

Each lower mandrel 62 is additionally capable of spinning about the axis of its shaft 96 when a pulley area 110 thereof is brought into contact with the spin welder driving belt 34 (FIG. 2 and FIG. 4B) during a predetermined number of degrees of the rotation of the mandrel about the central axis of the spin welder 32. For this purpose, bearing means 111 are interposed between each mandrel 62 and its shaft 96 as indicated in FIGS. 4A through 4C.

The upper vacuum supply indicated generally at 86 is suitably connected to a vacuum port 114 which feeds to the periphery of a central opening 116 within the upper mandrel 60. The shape of this opening conforms generally to the shape of the upper container half 4. The vacuum is applied about the outer periphery of the container half 4 when it is being surrounded by the upper mandrel 60.

Slidable relative to the upper mandrel shaft 94 is a stage member 118 which may be utilized in separating a joined container from the upper mandrel 60. The vacuum applied within the opening 116 may produce a tendency for the container to stick in the mandrel, but as the mandrel 60 is retracted, the stage 118 presses against the container lip to overcome any such difficulty. An extra increment of relative movement of this stage may be accomplished by means of a cam follower 122 connected to a rod 120 which has the stage 118 on one end thereof. The cam follower 122 may be vertically positionable by means of a stationary cam track 124 in a manner similar to that previously discussed with reference to vertical movement of the mandrels 60 and 62.

A pedestal assembly 112 in accordance with the invention is carried by the upper end of the lower mandrel shaft 96 as shown more clearly with reference to FIGS. 4A through 4C. The lower container half 6 is slid onto the surface of the pedestal assembly by the star wheel 18.

The conformance of the pedestal assembly to the bottom of the container half assures accurate centering of the container half on the assembly 112 and prevents distortion of the container half bottom when vacuum is applied during spinning operations. Also, support for the container bottom is provided throughout its diameter.

The pedestal assembly 112 comprises a generally flat upper surface 122 having a diameter approximately equal to that of the central recess in the container bottom. The depth of this flat surface also conforms to that of the container half recess. Extending outwardly from the surface 122 there is provided a protruding lip 124. This lip may be substantially flat and serves to support the outer edges of the container half 26. An annular inclined surface 128 extends from the lip 124 to the edges of the surface 122 and also conforms to a complementary surface of the container half 6. Thus, it can be seen that container half support and alignment are significantly enhanced when the container halves are received from a transfer device.

A modification of the pedestal contour is shown in phantom in FIG. 4C. In this embodiment the lip 126 of the pedestal is slightly inclined upwardly away from the central axis of the assembly 112. This upward inclination may sometimes be desirable for certain shaped containers, which may have a tendency to misalign on the assembly 112.

A vacuum may be applied through a central opening 132 which communicates through the pedestal assembly 112 and to the container bottom. This vacuum is supplied from the aforementioned source 90 (see FIG. 3). The vacuum aids in holding the container when first received and during actual spin welding.

The pedestal assembly 112 also cooperates with the mandrel 62 during the spinning and welding operation by providing support for the bottom of the container half 6 to prevent container half distortion and consequent disengagement from the mandrel 62. Vertically extending ribs formed along the lower container half outer periphery may be provided to mate with flutes within the mandrel 62. These ribs provide some degree of vertical strength and additionally positively engage the mandrel opening so that spinning of the mandrel also spins the surrounded container half.

FIG. 4B, as previously noted, shows the mandrel 62 being spun about its axis by the belt 34. During this spinning the mandrel is raised to its highest vertical height to surround the lower container half 6 and cause it to abut the upper container half 4.

The pedestal assembly 112 is lifted clear of shaft 96 by the mandrel 62 to permit the pedestal to remain with the lower container half 6 and to spin therewith during the spinning operation. The edge 130 of the lip 124 engages the inner surface of the mandrel just prior to actual spinning. This engagement lifts the pedestal assembly stem 134 slightly and incrementally raises the assembly 112 from the shaft 96. The pedestal assembly 112, therefore, is caused to spin with the mandrel 62, as shown in FIG. 4B. A slot 136 is formed within the shaft 96 so that the stem 134 may move vertically therein. An O-ring 138 encircles the stem 134 and functions as a retainer to prevent the pedestal from leaving the shaft 96 during spinning operation.

Although a single embodiment of the invention has been illustrated and described in detail, it will be evident that not all of the features of the invention need be used together in every instance and that various modifications may be made without departing from the principles of the invention. Accordingly, it is to be understood that the foregoing description should be considered as exemplary and that the scope of the invention should be ascertained from the following claims.

What is claimed is:

1. In an apparatus wherein container elements are selectively frictionally welded to form a container, a pedestal assembly adapted to receive and restrain a container element against movement along two perpendicularly oriented axes, said pedestal assembly comprising:
a stage portion adapted to contact the container element for supporting the container element against movement along one of said axes;
a protruding lip portion projecting from said stage portion for supporting the container element against movement along the other of said axes.

2. A pedestal assembly according to claim 1 wherein the stage portion aligns and supports the container element against movement along one of said axes, said portion also aligning and supporting the container element against movement along the other of said axes.

3. A pedestal assembly according to claim 1 wherein said protruding lip portion aligns and supports the container element against movement along one of said axes, said protruding lip portion also aligning and supporting the container element against movement along the other of said axes.

4. An apparatus according to claim 1 wherein said pedestal assembly further includes a vacuum applying means for aiding in retention of the container element by said pedestal assembly.

5. In an apparatus wherein two mating container elements are selectively frictionally welded to form a container, a pedestal assembly for receiving a container element comprising:
a stage portion for mating with a recess of a container element;
a protruding lip portion disposed below and extending beyond said stage portion for supporting a portion of the container element; and
an angularly disposed surface interconnecting said stage portion and said lip portion, and being complementary to an edge of a recess formed within the base portion of the container element.

6. A pedestal assembly according to claim 4 wherein said protruding lip portion has an upwardly turned outer periphery for aiding container element alignment and capture.

7. An apparatus according to claim 4 wherein said pedestal assembly further includes a vacuum applying means for aiding in retention of the container element by said pedestal assembly.

References Cited

UNITED STATES PATENTS

| | | | |
|---|---|---|---|
| 3,297,504 | 1/1967 | Brown et al. | 156—73 |
| 3,316,135 | 4/1967 | Brown et al. | 156—73 |
| 3,340,114 | 9/1967 | Taylor et al. | 156—73 |
| 3,385,741 | 5/1968 | Allen | 156—73 |

J. TRAVIS BROWN, Primary Examiner

A. T. SURO PICO, Assistant Examiner

U.S. Cl. X.R.

156—73